(12) United States Patent
Plaza et al.

(10) Patent No.: US 11,125,217 B2
(45) Date of Patent: Sep. 21, 2021

(54) PRESSURE-REDUCING CHOKE ASSEMBLY

(71) Applicant: SCHLUMBERGER TECHNOLOGY CORPORATION, Sugar Land, TX (US)

(72) Inventors: Gustavo Plaza, Houston, TX (US); Kim A. Hodgson, Sugar Land, TX (US); Gocha Chochua, Sugar Land, TX (US); Walter Taylor, Sugar Land, TX (US); Donald E. Hensley, Sugar Land, TX (US); John Starr, Houston, TX (US); Jijo Oommen Joseph, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 14/933,160

(22) Filed: Nov. 5, 2015

(65) Prior Publication Data

US 2017/0130706 A1    May 11, 2017

(51) Int. Cl.
| | | |
|---|---|---|
| *F04B 47/02* | (2006.01) | |
| *E21B 21/08* | (2006.01) | |
| *F04B 11/00* | (2006.01) | |
| *E21B 34/00* | (2006.01) | |
| *E21B 43/12* | (2006.01) | |
| *E21B 43/26* | (2006.01) | |
| *F04B 19/22* | (2006.01) | |
| *F04B 23/06* | (2006.01) | |
| *G05D 16/02* | (2006.01) | |

(Continued)

(52) U.S. Cl.
CPC .......... *F04B 11/0091* (2013.01); *E21B 34/00* (2013.01); *E21B 43/12* (2013.01); *E21B 43/26* (2013.01); *F04B 19/22* (2013.01); *F04B 23/06* (2013.01); *F04B 47/02* (2013.01); *G05D 16/02* (2013.01); *E21B 21/106* (2013.01); *E21B 47/06* (2013.01)

(58) Field of Classification Search
CPC ...... F04B 47/02; F04B 11/0091; E21B 43/12; E21B 21/08; E21B 21/106; E21B 34/02
USPC .......................................... 138/44; 166/91.1
See application file for complete search history.

(56) References Cited

U.S. PATENT DOCUMENTS

| | | |
|---|---|---|
| 4,354,552 A | 10/1982 | Zingg |
| 4,644,974 A | 2/1987 | Zingg |

(Continued)

OTHER PUBLICATIONS

McLaury et al., "Effect of Entrance Shape on Erosion in the Throat of Chokes", ASME, vol. 122, Dec. 2000, pp. 198-204.
McLaury et al., "Predicting Sand Erosion in Chokes for High Pressure Wells", SPE 49308, 1998 SPE Annual Technical Conference and Exhibition, Sep. 27-30, 1998, pp. 769-780.

(Continued)

*Primary Examiner* — Paul J Gray

(57) ABSTRACT

A choke for fluid connection between a manifold and a pump. The choke includes a fluid passage having an inlet, a contraction portion, a throat, an expansion portion, and an outlet. The inlet has a first diameter and the outlet has a second diameter. The throat is substantially cylindrical, having a third diameter that is substantially less than the first and second diameters. The contraction portion connects the inlet and the throat and gradually decreases from the first diameter to the third diameter along a longitudinal axis of the fluid passage. The expansion portion connects the throat and the outlet and includes a substantially cylindrical chamber having the second diameter.

20 Claims, 4 Drawing Sheets

(51) Int. Cl.
    *E21B 21/10* (2006.01)
    *E21B 47/06* (2012.01)

(56) References Cited

U.S. PATENT DOCUMENTS

| | | | |
|---|---|---|---|
| 7,086,417 B2 * | 8/2006 | De Almeida | F04F 1/20 138/44 |
| 2006/0219967 A1 | 10/2006 | Wang | |
| 2012/0186662 A1 * | 7/2012 | De Almeida | E21B 43/123 137/155 |
| 2014/0231554 A1 * | 8/2014 | Ungchusri | E21B 43/26 239/722 |
| 2015/0159795 A1 | 6/2015 | Ungchusri et al. | |

OTHER PUBLICATIONS

McLaury et al., "How Erosion-Corrosion Patters in a Choke Change as Material Losses in the Choke Progress", Corrosion 96, The NAC International Annual Conference and Exposition, Paper No. 16, 1996, 16 pages.

Ali et al., "Sand Erosion Control by Using Chokes in Series in Deep, High Pressure Oil Producing Wells in North of Monagas, Venezuela", SPE 38843, SPE Annual Technical Conference and Exhibition, Oct. 5-8, 1997, pp. 987-998.

Peri et al., "Understanding Erosion Prediction: Determining Erosion in a Choke", IPTC 11770, International Petroleum Technology Conference, Dec. 4-6, 2007, 9 pages.

International Search Report and Written Opinion issued in International Patent Application No. PCT/US2016/060412 dated Mar. 2, 2017; 14 pages.

\* cited by examiner

PRESSURE-REDUCING CHOKE ASSEMBLY

BACKGROUND OF THE DISCLOSURE

In oilfield operations, reciprocating pumps are utilized at wellsites for large scale, high-pressure operations. Such operations may include drilling, cementing, acidizing, water jet cutting, and hydraulic fracturing of subterranean formations. In some applications, several pumps may be connected in parallel to a single manifold, flow line, or well. Some reciprocating pumps include reciprocating members driven by a crankshaft toward and away from a fluid chamber to alternatingly draw in, pressurize, and expel fluid from the fluid chamber. Hydraulic fracturing of a subterranean formation, for example, may utilize fluid at a pressure exceeding 15,000 pounds per square inch (PSI).

A reciprocating pump may discharge pressurized fluid in an oscillating manner that forms fluid pressure fluctuations at the pump outlet. The oscillating pressure fluctuations may be amplified in a pumping system comprising two or more reciprocating pumps, such as due to resonance phenomena caused by interaction between two or more fluid flows, thus producing high-pressure spikes. At a wellsite, the oscillation and the amplified high-pressure spikes may be transmitted to the piping and/or other portions of the wellsite system, causing vibrations and strain in such equipment. Equipment failures have been linked to material fatigue caused by systematic occurrence of such oscillations, spikes, vibration, and strain. Such failures may be reduced by installing pressure-reducing chokes between pump outlets and the downstream equipment, but such chokes exhibit short service lives due to erosion caused by the oscillations, spikes, vibration, and strain induced by the pressurized fluid discharged by the pumps.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus that includes a manifold, multiple pumps, and choke assemblies each fluidly connected between the manifold and a corresponding one of the pumps. Each choke assembly includes a body having a fluid passage conducting fluid from the corresponding pump to the manifold. The fluid passage includes an inlet having a first diameter, an outlet having a second diameter, a substantially cylindrical throat having a third diameter that is substantially less than the first and second diameters, a contraction portion connecting the inlet and the throat and gradually decreasing from the first diameter to the third diameter along a longitudinal axis of the fluid passage, and an expansion portion connecting the throat and the outlet. The expansion portion is or substantially includes a substantially cylindrical chamber having the second diameter.

The present disclosure also introduces a method that includes connecting a choke assembly in fluid communication between a pump and a manifold such that a fluid passage of the choke assembly conducts fluid from the pump to the manifold. The fluid passage includes an inlet having a first diameter, an outlet having a second diameter, a substantially cylindrical throat having a third diameter that is substantially less than the first and second diameters, a contraction portion connecting the inlet and the throat and gradually decreasing from the first diameter to the third diameter along a longitudinal axis of the fluid passage, and an expansion portion connecting the throat and the outlet. The expansion portion is or substantially includes a substantially cylindrical chamber having the second diameter. The method also includes operating the pump to move the fluid through the choke assembly toward the manifold.

The present disclosure also introduces an apparatus that includes a choke assembly for fluid connection between a manifold and a pump. A fluid passage of the choke assembly includes an inlet having a first diameter, an outlet having a second diameter, a substantially cylindrical throat having a third diameter that is substantially less than the first and second diameters, a contraction portion connecting the inlet and the throat and gradually decreasing from the first diameter to the third diameter along a longitudinal axis of the fluid passage, and an expansion portion connecting the throat and the outlet. The expansion portion is or substantially includes a substantially cylindrical chamber having the second diameter.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
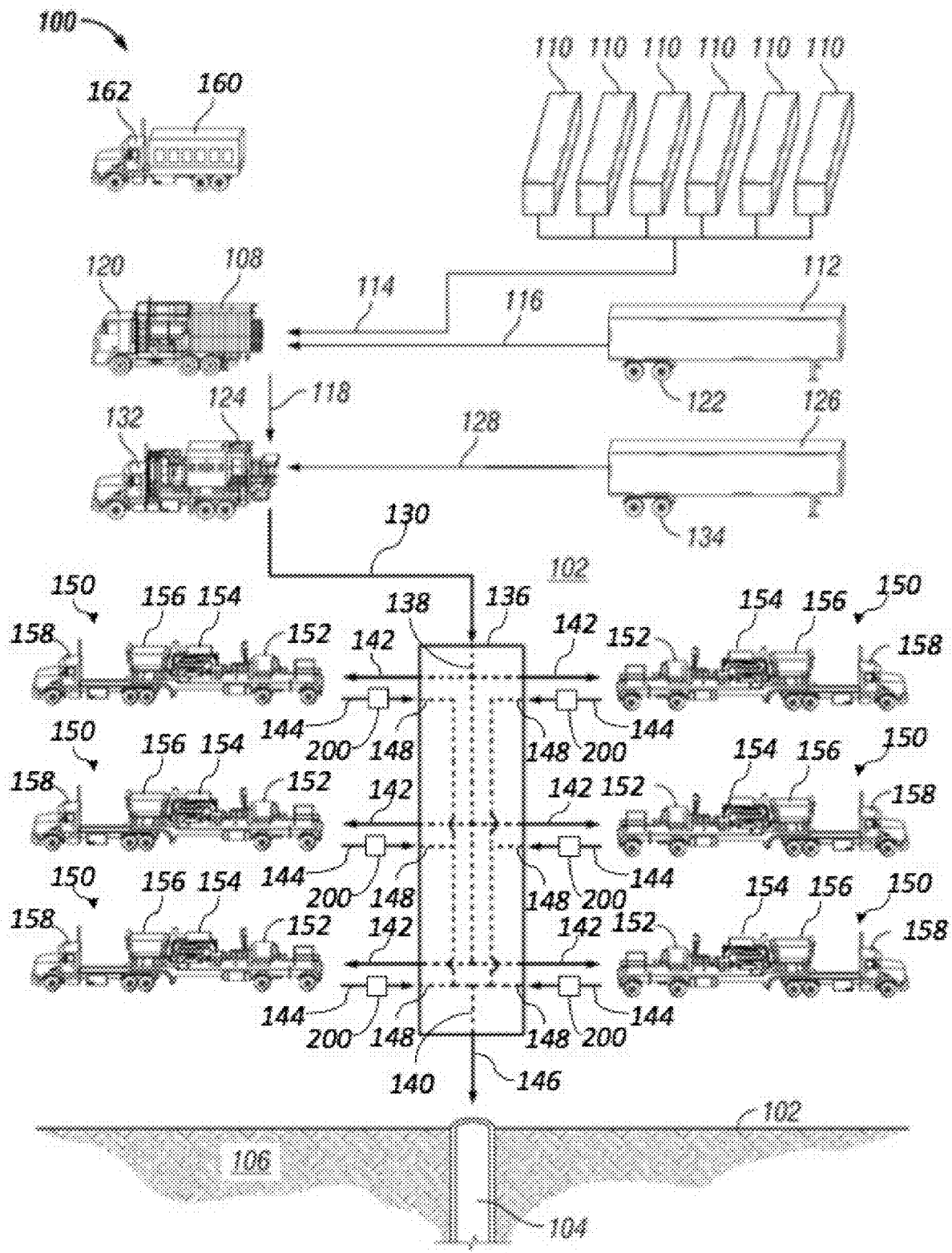
FIG. 1 is a schematic view of at least a portion of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of an example wellsite system 100 according to one or more aspects of the present disclosure, representing an example environment in which one or more aspects described below may be implemented. The figure depicts a wellsite 102 adjacent to a wellbore 104 and a partial sectional view of the subterranean formation 106 penetrated by the wellbore 104 below the wellsite 102. The wellsite system 100 may comprise a first mixer 108 fluidly connected with one or more tanks 110 and a first container 112. The first container 112 may contain a first material and the tanks 110 may contain a liquid. The first material may be or comprise a hydratable material or gelling agent, such as guar, polymers, synthetic polymers, galactomannan, polysaccharides, cellulose, and/or clay, among other examples, and the liquid may be or comprise an aqueous fluid, which may comprise water or an aqueous solution comprising water, among other examples. The first mixer 108 may be operable to receive the first material and the liquid via two or more fluid conduits 114, 116, and mix or otherwise combine the first material and the liquid to form a base fluid. The base fluid may be or comprise that which is known in the art as a gel. The first mixer 108 may then discharge the base fluid via one or more fluid conduits 118.

The first mixer 108 and the first container 112 may each be disposed on corresponding trucks, trailers, and/or other mobile carriers 120, 122, respectively, such as may permit their transportation to the wellsite 102. However, the first mixer 108 and/or first container 112 may be skidded or otherwise stationary, and/or may be temporarily or permanently installed at the wellsite 102.

The wellsite system 100 may further comprise a second mixer 124 fluidly connected with the first mixer 108 and a second container 126. The second container 126 may contain a second material that may be substantially different than the first material. For example, the second material may be or comprise a proppant material, such as sand, sand-like particles, silica, quartz, and/or propping agents, among other examples. The second mixer 124 may be operable to receive the base fluid from the first mixer 108 via one or more fluid conduits 118, and the second material from the second container 126 via one or more fluid conduits 128, and mix or otherwise combine the base fluid and the second material to form a mixture. The mixture may be or comprise that which is known in the art as a fracturing fluid. The second mixer 124 may then discharge the mixture via one or more fluid conduits 130.

The second mixer 124 and the second container 126 may each be disposed on corresponding trucks, trailers, and/or other mobile carriers 132, 134, respectively, such as may permit their transportation to the wellsite 102. However, the second mixer 124 and/or second container 126 may be skidded or otherwise stationary, and/or may be temporarily or permanently installed at the wellsite 102.

The mixture may be communicated from the second mixer 124 to a common manifold 136 via the one or more fluid conduits 130. The common manifold 136 may comprise a plurality of valves and diverters, as well as a suction line 138 and a discharge line 140, such as may be operable to direct flow of the mixture in a selected or predetermined manner. The common manifold 136, which may be known in the art as a missile or a missile trailer, may distribute the mixture to a pump fleet, which may comprise a plurality of pump assemblies 150 each comprising a pump 152, a prime mover 154, and perhaps a heat exchanger 156. Each pump assembly 150 may receive the mixture from the suction line 138 of the common manifold 136, via one or more fluid conduits 142, and discharge the mixture under pressure to the discharge line 140 of the common manifold 136, via one or more fluid conduits 144. Each pump assembly 150 may discharge the mixture at a pressure ranging between about 4,000 PSI and about 15,000 PSI, or more. The mixture may then be discharged from the common manifold 136 into the wellbore 104 via one or more fluid conduits 146, perhaps through various valves, conduits, and/or other hydraulic circuitry fluidly connected between the common manifold 136 and the wellbore 104. Each pump 152 of the plurality of pump assemblies 150 may be fluidly connected with the other pumps 152 via the plurality of fluid conduits 144 and the discharge line 140 of the common manifold 136.

The common manifold 136 may be mounted on a corresponding truck, trailer, and/or another mobile carrier, such as may permit its transportation to the wellsite 102. However, the common manifold 136 may be skidded or otherwise stationary, and/or may be temporarily or permanently installed at the wellsite 102. The common manifold 136 or a portion of the common manifold 136 may also be or comprise treating iron or other process piping configured as a ground manifold. Furthermore, the pump assemblies 150 may each be mounted on corresponding trucks, trailers, and/or other mobile carriers 158, such as may permit their transportation to the wellsite 102. However, the pump assemblies 150 may be skidded or otherwise stationary, and/or may be temporarily or permanently installed at the wellsite 102.

The pump assemblies 150 shown in FIG. 1 may comprise pumps 152 having a substantially same or similar structure and/or function, although other implementations within the scope of the present disclosure may include different types and/or sizes of pumps 152. Although the pump fleet of the wellsite system 100 is shown comprising six pump assemblies 150, each disposed on a corresponding mobile carrier 158, pump fleets comprising other quantities of pump assemblies 150 are also within the scope of the present disclosure.

The wellsite system 100 may also comprise a control center 160, such as may be operable to monitor and control at least a portion of the wellsite system 100 during pumping operations. For example, the control center 160 may be operable to monitor and control operational parameters of each pump assembly 150, such as operating frequency or speed, phase or rotational position, temperature, and pressure.

The control center 160 may be disposed on a corresponding truck, trailer, and/or other mobile carrier 162, such as may permit its transportation to the wellsite 102. However, the control center 160 may be skidded or otherwise stationary, and/or may be temporarily or permanently installed at the wellsite 102.

FIG. 1 shows the wellsite system 100 operable to produce and/or mix fluids and/or mixtures (hereinafter collectively referred to as a "fluid") that may be pressurized and individually or collectively injected into the wellbore 104 during hydraulic fracturing of the subterranean formation 106. However, it is to be understood that the wellsite system 100 may be operable to mix and/or produce other mixtures and/or fluids that may be pressurized and individually or collectively injected into the wellbore 104 during other oilfield operations, such as drilling, cementing, acidizing, chemical injecting, and/or water jet cutting operations, among other examples.

During operations of the wellsite system 100, the pumps 152 may discharge the pressurized fluids in an oscillating manner. Accordingly, some portions of the wellsite system 100 may experience amplified high-pressure pulsations or spikes due to a resonance phenomenon caused by interaction of two or more oscillating fluid streams discharged from two or more pumps 152. Such amplified high-pressure spikes may be transmitted through or along the fluid conduits 144, 146, the common manifold 136, and/or other portions of the wellsite system 100 fluidly connected downstream from the pumps 152. The oscillating nature of the fluid discharged by the pumps 152 and the amplified high pressure spikes caused by the fluid resonance may produce vibrations in the fluid conduits 144, 146, the common manifold 136, and/or other equipment located downstream from the pumps 152. As equipment failures have been linked to material fatigue caused by systematic occurrence of these pressure fluctuations and vibrations, functional or service life of certain wellsite equipment may be increased by reducing the magnitude of these pressure fluctuations. Accordingly, the wellsite system 100 may further comprise a plurality of choke assemblies 200 operable to produce a pressure drop in the fluid being discharged by the pumps 152.

Each choke assembly 200 may be connected along a corresponding fluid conduit 144 between a pump outlet and a corresponding fluid inlet 148 of the common manifold 136. The pressure drop caused by each choke assembly 200 may be monitored by the control center 160 via one or more pressure sensors located along each fluid conduit 144. For example, a pressure sensor may be located between each pump 152 and choke assembly 200, and another pressure sensor may be located between the common manifold 136 and each choke assembly 200.

Figure 2:
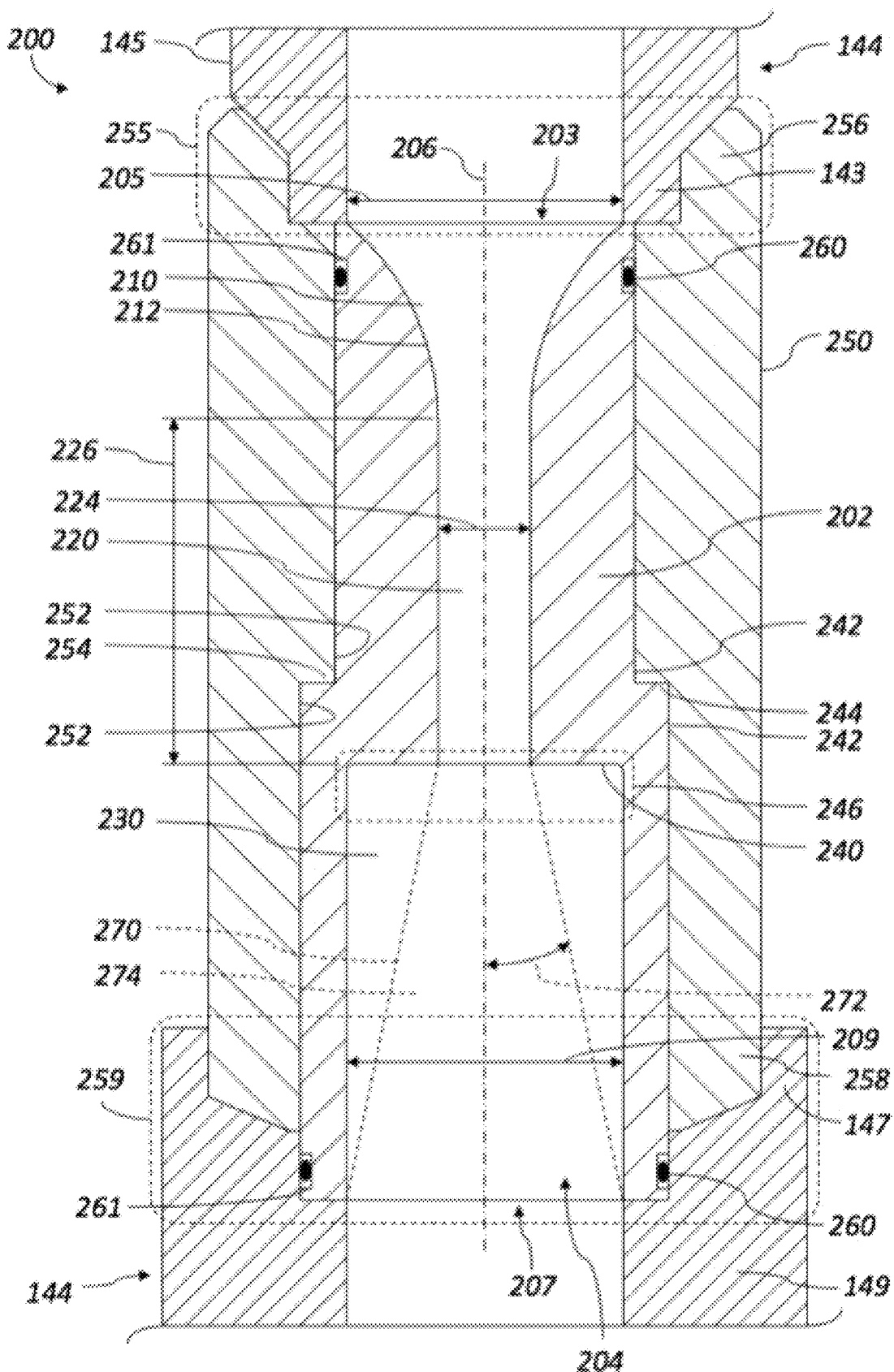
FIG. 2 is a side sectional view of an example implementation of a portion of the apparatus shown in FIG. 1 according to one or more aspects of the present disclosure.

FIG. 2 is a side sectional view of an example implementation of one of the choke assemblies 200 shown in FIG. 1 according to one or more aspects of the present disclosure. The choke assembly 200 comprises a body 202. A fluid passage 204 extends through the body along a longitudinal axis 206 of the body 202. The fluid passage 204 comprises an inlet 203 and an outlet 207. A diameter 205 of the inlet 203 may be substantially equal (e.g., within about 5%) to a diameter 209 of the outlet 207. The fluid passage 204 also comprises a contraction portion 210, a throat 220, and an expansion portion 230 collectively extending between the inlet 203 and the outlet 207.

The throat 220 is substantially cylindrical, having a diameter 224 that is substantially less than the inlet and outlet diameters 205, 209. The contraction portion 210 is defined by an inwardly tapered or otherwise converging surface 212 extending between the inlet 203 and the throat 220, such that the contraction portion 210 gradually and/or substantially continuously decreases in diameter from the inlet diameter 205 to the throat diameter 224 along the axis 206. The cross-sectional provide of the converging surface 212 may be substantially rounded or otherwise non-linear. The expansion portion 230 is a substantially cylindrical chamber extending between the throat 220 and the outlet 207 and having the same diameter as the outlet diameter 209. An end of the substantially cylindrical expansion portion 230 is defined by an annular surface 240 extending radially from the throat 220 such that the axis 206 of the fluid passage is substantially coincident with a normal of the annular surface 240. The interface between the annular surface 240 and the substantially cylindrical inner surface of the expansion portion 230 may be tapered or rounded, such as may prevent or reduce initiation of cracking at the interface.

The choke assembly 200 may also comprise a housing 250 in which the body 202 may be threadedly and/or otherwise removably disposed. The housing 250 and the body 202 may comprise various mating features, such as for indicating full insertion of the body 202 into the housing 250 and/or for reacting axially directed forces generated by fluid flowing through the passage 204. For example, the housing 250 may comprise an internal mating feature 254 that contacts an external mating feature 244 of the body 202. The external mating feature 244 may be a shoulder connecting proximate ends of first and second substantially cylindrical external surfaces 242 of the body 202, and the internal mating feature 254 may be a shoulder connecting proximate ends of corresponding first and second substantially cylindrical internal surfaces 252 of the housing 250. As depicted in the example implementation shown in FIG. 2, the mating features 244, 254 may each be substantially planar, such that surface normals thereof extend substantially parallel to the axis 206 (although in opposite directions). However, the mating features 244, 254 may also be tapered relative to the axis 206 and/or otherwise shaped. The external surfaces 242 of the body 202 and/or the internal surfaces 252 of the housing 250 may also not be substantially cylindrical, such as in implementations in which the external profile of the body 202 and the internal profile of the housing 250 are otherwise correspondingly shaped in a manner permitting the body 202 to be removably disposed within the housing 250.

The choke assembly 200 may be coupled between opposing portions 145, 149 of the fluid conduit 144 via various means. For example, as depicted in the example implementation shown in FIG. 2, an upstream coupling 255 between the upstream portion 145 of the fluid conduit 144 and the inlet end of the choke assembly 200 may be between a mechanical, fluid-conducting connector and/or other interface 143 of the upstream portion 145 and a correspondingly similar interface 256 of the housing 250. However, the body 202 and/or another component of the choke assembly 200 may also or instead at least partially form or comprise the interface 256 and/or other means for connecting with the upstream portion 145 of the fluid conduit 144. As also depicted in the example implementation shown in FIG. 2, a downstream coupling 259 between the downstream portion 149 of the fluid conduit 144 and the outlet end of the choke assembly 200 may be between a mechanical, fluid-conducting connector and/or other interface 147 of the downstream portion 149 and a correspondingly similar interface 258 of the housing 250. However, the body 202 and/or another component of the choke assembly 200 may also or instead at least partially form or comprise the interface 258 and/or other means for connecting with the downstream portion 149 of the fluid conduit 144. The interfaces 143, 147, 256, 258 may comprise threaded portions, clamps, and/or other means for making up the mechanical, fluid-conducting couplings 255, 259.

A fluid seal may be achieved between the body 202, the housing 250, and/or the portions 145, 149 of the fluid conduit 144, such as may prevent fluid from leaking between the body 202, the housing 250, and/or the fluid conduit 144. For example, the choke assembly 200 may comprise one or more optional fluid seals 260 disposed in corresponding grooves 261 extending into one or more of the outer surfaces 242 of the body 202, such that each fluid seal 260 prevents the passage of fluid between the body 202 and the housing 250 or the portions 145, 149 of the fluid conduit 144. The fluid seals 260 may include seal rings, cup seals, O-rings, and/or other sealing means. In an embodiment, the fluid seal between the body 202, the housing 250, and/or the portions 145, 149 of the fluid conduit 144 may comprises a metal-to-metal seal, and/or the various components 202, 250, and/or 144 may be connected by a threaded or welded connection. Although the choke assembly 200 shown in FIG. 2 comprises multiple components (i.e., the body 202 and the housing 250), it is to be understood that the choke assembly 200 may also be implemented as a single, discrete member, such as in implementations in which the body 202 and the housing 250 are integrally formed, such that the external surfaces 242 of the body 202 and the internal surfaces 252 of the housing 250 do not exist, or in implementations in which the housing 250 does not exist. However, such implementations may otherwise comprise substantially the same structure and/or operation described herein.

The geometry of the fluid passage 204 may cause an energy loss in the fluid flowing through the fluid passage 204 by introducing a pressure drop in the fluid and, thus, reducing vibration and the resulting fatigue failures in the downstream equipment, such as the fluid conduits 144, 146 and the common manifold 136. Comparative studies were conducted between chokes having a geometry similar to the choke assembly 200 shown in FIG. 2 and described above (hereinafter referred to as a "sudden expansion choke") and chokes having a gradually expanding expasion portion as currently utilized in the industry (hereinafter referred to as a "gradual expansion choke"). A gradual expansion choke differs from the choke assembly 200 shown in FIG. 2 in that, instead of the substantially cylindrical expansion portion 230 extending between the throat 220 and the outlet 207, the throat 220 and the outlet 207 are connected by a frustoconical or otherwise gradually expanding portion 274 defined by a gradually expanding surface 270, as depicted in FIG. 2 in phantom lines to more clearly show the geometric differences between the sudden expansion choke and the gradual expansion choke. The gradually extending surface 270 extends from the throat 220 at an angle 272 with respect to the axis 206. The comparative studies demonstrated that a sudden expansion choke according to one or more aspects introduced in the present disclosure exhibited improved performance relative to gradual expansion chokes.

Figure 3:
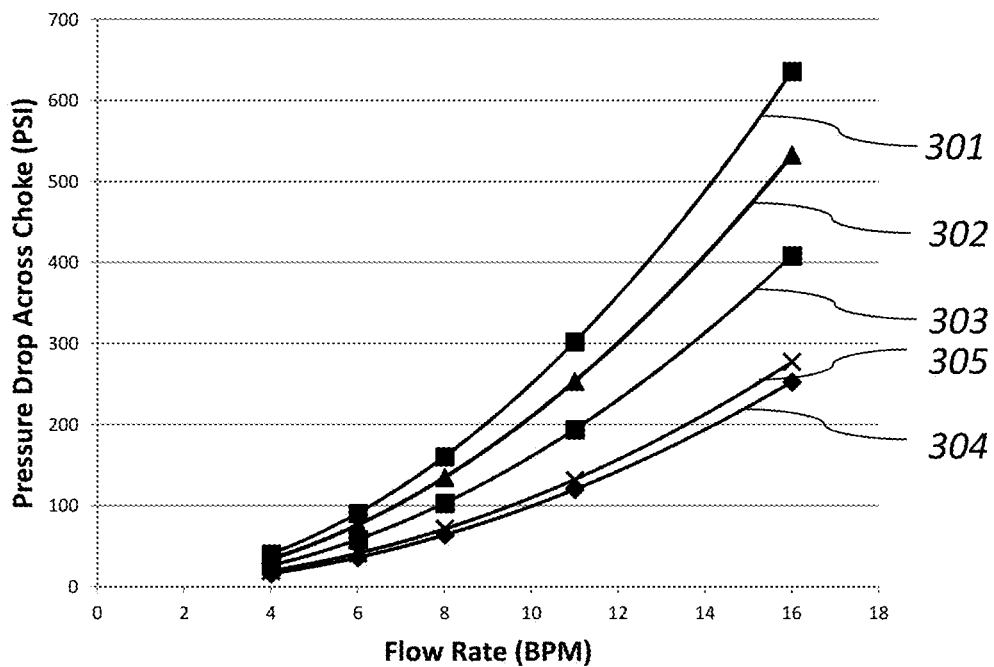
FIG. 3 is a graph related to one or more aspects of the present disclosure.
Figure 4:
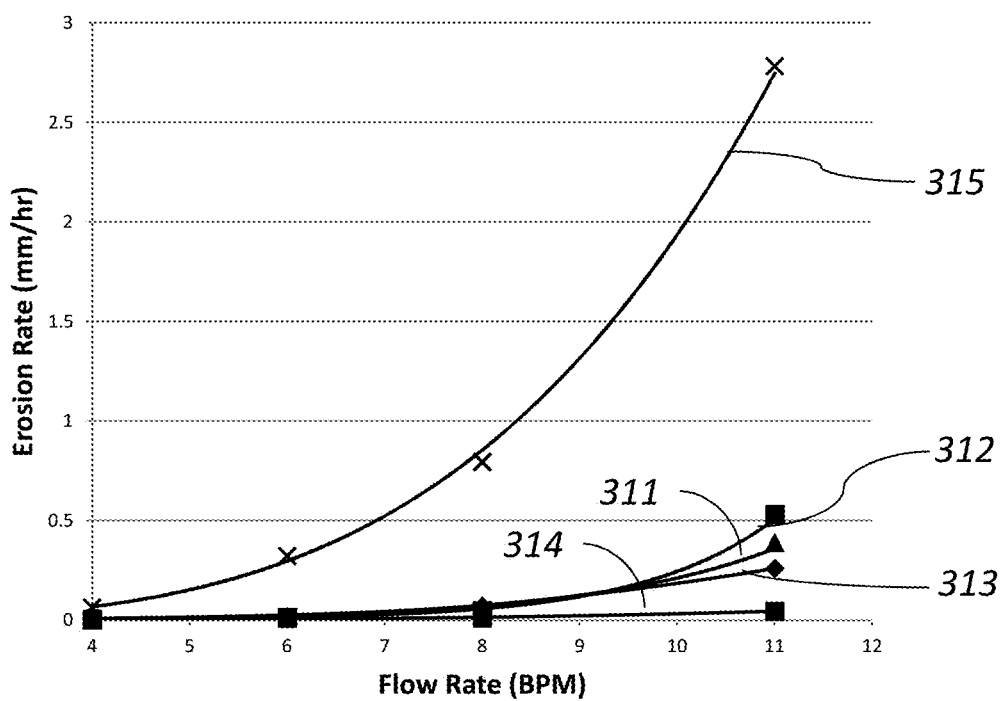
FIG. 4 is a graph related to one or more aspects of the present disclosure.

A first comparative study included simulating, measuring, and comparing fluid flow rates through several chokes, pressure drops across the chokes, and erosion experienced by the chokes. Such study simulated high-pressure water at room temperature pumped through a gradual expansion choke and four sudden expansion chokes, each having a different throat diameter. The gradual expansion choke had a throat diameter of about 2.5 centimeters (cm), and the four sudden expansion chokes had throat diameters of about 2.8 cm, about 2.5 cm, about 2.4 cm, and about 2.2 cm. The throats of the sudden expansion chokes had an axial length (such as the axial length 226 shown in FIG. 2) ranging between about 5 cm and about 10 cm. The water flow ranged between about 5 barrels per minute (BPM) and about 15 BPM. Three pressure transducers were simulated to measure water pressure at three different locations with respect to each choke. A first pressure transducer measured pressure at an inlet of each choke, a second pressure transducer measured pressure at an outlet of each choke, and a third pressure transducer measured pressure further downstream (e.g., about 45 cm) from each choke. FIGS. 3 and 4 are graphs showing the results of the first comparative study. The following description refers to FIGS. 2-4, collectively.

The graph in FIG. 3 depicts a plurality of curves from the simulation showing the relationship between the measured pressure drop across each choke, in PSI, and the flow rate of water through each choke, in BPM. Curves 301, 302, 303, 304 depict the relationship between the pressure drop and the flow rate for the sudden expansion chokes comprising the throat diameters of about 2.2 cm, about 2.4 cm, about 2.5 cm, and about 2.8 cm, respectively. Curve 305 depicts the relationship between the pressure drop and the flow rate for the gradual expansion choke comprising the throat diameter of about 2.5 cm.

The curves 301, 302, 303 show that the pressure drops caused by the sudden expansion chokes having the throat diameters of about 2.2 cm, about 2.4 cm, and about 2.5 cm, respectively, were greater than the pressure drop caused by the gradual expansion choke having the throat diameter of about 2.5 cm, shown by the curve 305. Furthermore, the curve 304 shows that the pressure drop caused by the sudden expansion choke having the throat diameter of about 2.8 cm was similar or slightly smaller than the pressure drop caused by the gradual expansion choke having the throat diameter of about 2.5 cm, shown by the curve 305. Such results indicate that the sudden expansion choke geometry causes a greater energy loss than the gradual expansion choke geometry, thereby more effectively decreasing downstream pressure fluctuations caused by the pumps 152. This conclusion is especially evident when comparing curves 303, 305, showing the pressure drops caused by the sudden expansion and gradual expansion chokes having the same throat diameter, wherein the sudden expansion choke having the throat diameter of about 2.5 cm caused a substantially greater pressure drop (e.g., by about 55 PSI at 10 BPM) than the gradual expansion choke having the same throat diameter. The conclusion is further supported by comparing curves 304, 305, which show that the sudden expansion choke having the throat diameter of about 2.2 cm caused a similar pressure drop (e.g., about 100 PSI at 10 BPM) as the gradual expansion choke. Accordingly, the comparative study results show that when utilizing chokes having the same throat diameters under the same flow conditions, the sudden expansion choke geometry causes a greater energy loss and, thus, a greater pressure drop than the gradual expansion choke.

Examining the curves 301, 302, 303, 304 at an example water flow rate of about 10 BPM, the sudden expansion choke having the throat diameter of about 2.2 cm produced a pressure drop of about 255 PSI, the sudden expansion choke having the throat diameter of about 2.4 cm produced a pressure drop of about 215 PSI, the sudden expansion choke having the throat diameter of about 2.5 cm produced a pressure drop of about 160 PSI, and the sudden expansion choke having the throat diameter of about 2.8 cm produced a pressure drop of about 106 PSI. Accordingly, the maximum flow rate for a sudden contraction choke having the throat diameter of about 2.8 cm to achieve about a 100 PSI pressure drop is about 10 BPM.

To test for erosion susceptibility, a mixture of corrosive particles (e.g., sand) and high-pressure water was simulated to flow through the chokes. The graph in FIG. 4 depicts a plurality of curves showing the relationship between a rate of erosion experienced by each choke, in millimeters per hour (mm/hr), against the flow rate of the mixture through each choke, in BPM. Curves 311, 312, 313, 314 depict the relationship between the erosion rate and the flow rate associated with the sudden expansion chokes comprising the throat diameters of about 2.2 cm, 2.4 cm, 2.5 cm, and 2.8 cm, respectively. Curve 315 depicts the relationship between the erosion rate and the flow rate associated with the gradual expansion choke comprising the throat diameter of about 2.5 cm. The erosion experienced by the sudden expansion chokes was measured at an erosion region 246 (FIG. 2) located at the transition between the throat 220 and the expansion portion 230, including the annular surface 240 and an upstream portion of the expansion portion 230. The erosion measurements included measuring the amount (i.e., depth) of material that was lost from the erosion region 246. The erosion region 246 is a high wear concentration region caused by fluid turbulence produced by the high velocity fluid jet or stream that exits the throat 220 while carrying particles (e.g., proppant material), such that collisions between the particles and surfaces within the erosion region 246 cause erosion of the body 202 within the region 246. The erosion experienced by the gradual expansion choke was measured along the gradually expanding surface 270 within the erosion region 246.

As shown in FIG. 4, the erosion rates associated with the sudden expansion chokes were substantially less than the erosion rate associated with the gradual expansion choke for flow rates ranging between about 4 BPM and about 11 BPM. Such results demonstrated that sudden expansion chokes are substantially less susceptible to erosion caused by the particle-containing fluid flow. Furthermore, the erosion rates associated with the sudden expansion chokes having the throat diameters of about 2.5 cm and 2.8 cm, shown by the curves 313, 314, respectively, experienced the lowest erosion rates. Such results may be caused at least partially by lower fluid velocities associated with the larger throat diameters, as explained below.

Additional comparative studies were conducted using computational fluid dynamics (CFD) to numerically simulate performances of three chokes, each comprising a different geometry. The first choke was a gradual expansion choke having the gradually expanding surface 270 extending at the angle 272 of about 15 degrees. The second choke was a gradual expansion choke having the gradually expanding surface 270 extending at the angle 272 of about 40 degrees. The third choke was a sudden expansion choke. The CFD simulations included simulating a fluid flowing though the chokes. The simulated fluid comprised a mixture of water and sand having the following characteristics: water density of about 1,000 kilograms per cubic meter (kg/m$^3$), water viscosity of about one centipoise, sand density of about 2,650 kg/m$^3$, and an overall fluid density of about 0.25 PPA (lbm of proppant added per gallon).

The first simulation included comparing the three chokes, each comprising a throat diameter of about 2.5 cm, while the fluid flow rate was adjusted to produce a pressure drop of about 100 PSI. Some simulation parameters and results for the three chokes are set forth below in Table 1.

TABLE 1

| Choke Geometry | Throat Diameter (cm) | Pressure Drop (PSI) | Flow Rate (BPM) | Erosion Rate (mm/hr) |
|---|---|---|---|---|
| Gradual 15° | 2.5 | 100.18 | 10.55 | 0.310 |
| Gradual 40° | 2.5 | 100.22 | 8.81 | 0.123 |
| Sudden 90° | 2.5 | 100.08 | 7.56 | 0.063 |

The results showed that the sudden expansion choke geometry was less susceptible to erosion. For example, the erosion rate of 0.063 mm/hr associated with the sudden expansion choke is about half of the erosion rate of 0.123 mm/hr associated with the forty degree gradual expansion choke, and about five times less than the erosion rate of 0.310 mm/hr associated with the fifteen degree gradual expansion choke. The results further showed that the gradual expansion chokes were less effective at producing energy loss, because the gradual expansion chokes are tested at higher flow rates to achieve the intended 100 PSI pressure drop.

The second simulation included comparing the three choke geometries at a constant fluid flow rate of about 10 BPM, while the throat diameter was adjusted to produce a pressure drop of about 100 PSI. These simulation parameters and results for the three chokes are set forth below in Table 2.

TABLE 2

| Choke Geometry | Throat Diameter (cm) | Pressure Drop (PSI) | Flow Rate (BPM) | Fluid Velocity (meter/sec) | Erosion Rate (mm/hr) |
|---|---|---|---|---|---|
| Gradual 15° | 2.46 | 102.8 | 10 | 60.5 | 0.307 |
| Gradual 40° | 2.66 | 104.7 | 10 | 48.6 | 0.173 |
| Sudden 90° | 2.82 | 106.2 | 10 | 45.0 | 0.041 |

Such results also showed that the sudden expansion choke is less susceptible to erosion than the gradual expansion choke. For example, the erosion rate of 0.041 millimeters per hour (mm/hr) associated with the sudden expansion choke is about four times less than the erosion rate of 0.173 mm/hr associated with the forty degree gradual expansion choke, and about seven and a half times less than the erosion rate of 0.307 mm/hr associated with the fifteen degree gradual expansion choke. The results further showed that the gradual expansion chokes were less effective at producing energy loss. For example, the sudden expansion choke produced a pressure drop that was substantially similar to the pressure drop produced by the gradual expansion chokes despite the gradual expansion chokes having throat diameters smaller than the throat diameter of the sudden expansion choke.

The lower erosion rates associated with the sudden expansion choke shown in Tables 1 and 2 may be a result of several factors. Erosion is often expected at locations where the fluid exiting the throat changes direction and impacts certain inner surfaces extending at different angles. For example, in a sudden expansion choke, the fluid impacts the surfaces within the erosion region 246, whereas fluid flow in a gradual expansion choke impacts the gradually expanding surface 270. The erosion region 246 of the sudden expansion choke experiences less erosion because the fluid jet exiting the throat 220 remains substantially centered within the expansion portion 230, and the fluid located between the fluid jet and the cylindrical surface of the expansion portion 230 recirculates or moves against the erosion region 246 at a slower velocity, thus acting as buffer insulating the erosion region 246 from the high velocity fluid jet exiting the throat 220. However, the gradually expanding surface 270 of a gradual expansion choke experiences more erosion at least partially because the fluid jet exiting the throat is substantially closer to the gradually expanding surface 270, thus permitting the high-velocity sand particles to impact the gradually expanding surface 270.

The lower erosion rates associated with the sudden expansion choke shown in Tables 1 and 2 may also be partially affected by the throat diameters and fluid flow rates. For example, larger throat diameters and lower flow rates translate to lower velocities of the fluid moving through the throat. Because particles suspended within the fluid also have a lower velocity moving through the throat, the erosion rates caused by the particles are also lower. The results shown in Table 1 are consistent with this phenomenon. For example, the chokes associated with the lower flow rates comprise smaller erosion rates. The results shown in Table 2 are also consistent with this phenomenon. For example, the sudden expansion choke having the throat diameter of about 2.8 cm generated the lowest fluid velocity (45.0 meters per second (m/s)) through the choke and the lowest erosion rate (0.041 mm/hr). However, the 15- and 40-degree gradual expansion chokes having throat diameters of 2.46 cm and 2.66 cm generated higher fluid velocities (60.50 m/s and 48.6 m/s) and higher erosion rates (0.307 mm/hr and 0.173 mm/hr).

Figure 5:
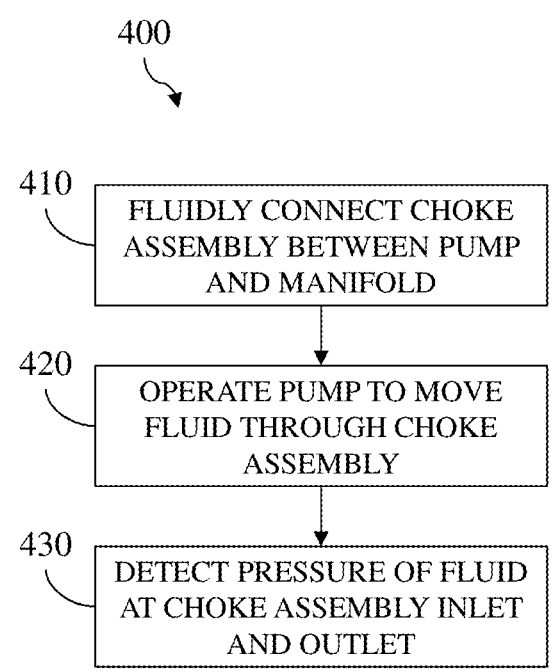
FIG. 5 is a flow-chart diagram of at least a portion of an example implementation of a method according to one or more aspects of the present disclosure.

FIG. 5 is a flow-chart diagram of at least a portion of an example implementation of a method (400) according to one or more aspects of the present disclosure. The method (400) may utilize at least a portion of a wellsite system and choke assembly, such as the wellsite system 100 shown in FIG. 1 and the choke assembly 200 shown in FIG. 2, for example. Thus, for the sake of clarity, the following description refers to FIGS. 1, 2, and 5, collectively.

The method (400) comprises connecting (410) the choke assembly 200 in fluid communication between a pump 152 and the manifold 136 such that the fluid passage 204 of the choke assembly 200 conducts fluid from the pump 152 to the manifold 136. As described above, various portions of fluid conduits 144 may connect the choke assembly 200 between the pump 152 and the manifold 136. Connecting (410) the choke assembly 200 in fluid communication between the pump 152 and the manifold 136 may comprise connecting the upstream conduit portion 145 with the inlet connector 256 of the choke assembly 200 and connecting the downstream conduit portion 149 with the outlet connector 258 of the choke assembly 200.

The method (400) also comprises operating (420) the pump 152 to move fluid through the choke assembly 200 towards the manifold 136. The fluid may be fracturing fluid. Operating (420) the pump 152 to move the fluid through the choke assembly 200 may produce a pressure drop in the fluid as the fluid moves through the choke assembly 200. Operating (420) the pump 152 may also move the fluid from the manifold 136 into the wellbore 104. Operating (420) the pump 152 may comprise discharging the fluid from the pump 152 at a pressure ranging between about 4,000 PSI and about 15,000 PSI. The method (400) may also comprise detecting (430) pressure of the fluid at the inlet 203 and the outlet 207 while operating (420) the pump to move fluid through the choke assembly 200 toward the manifold 136. Detecting (430) the pressure may be performed during wellsite operations, such as fracturing operations, during fluid flow rate setting operations, or during choke assembly 200 testing operations.

In view of the entirety of the present disclosure, including the claims and the figures, a person having ordinary skill in the art will readily recognize that the present disclosure introduces an apparatus comprising: a manifold; a plurality of pumps; and a plurality of choke assemblies each fluidly connected between the manifold and a corresponding one of the pumps, wherein each choke assembly comprises a body having a fluid passage conducting fluid from the corresponding pump to the manifold, and wherein the fluid passage comprises: an inlet having a first diameter; an outlet having a second diameter; a substantially cylindrical throat having a third diameter that is substantially less than the first and second diameters; a contraction portion connecting the inlet and the throat and gradually decreasing from the first diameter to the third diameter along a longitudinal axis of the fluid passage; and an expansion portion connecting the throat and the outlet and substantially comprising a substantially cylindrical chamber having the second diameter.

An end of the substantially cylindrical chamber may be defined by an annular surface extending radially from the throat such that the longitudinal axis of the fluid passage may be substantially coincident with a normal of the annular surface.

The contraction portion may substantially continuously decrease from the first diameter to the third diameter along the longitudinal axis of the fluid passage.

Each choke assembly may be operable to cause a pressure drop in the fluid conducted from the corresponding pump to the manifold.

The first and second diameters may be substantially equal.

Each choke assembly may further comprise: an inlet connector fluidly coupling the inlet with a first fluid conduit that fluidly connects the inlet with the corresponding pump; and an outlet connector fluidly coupling the outlet with a second fluid conduit that fluidly connects the outlet with the manifold.

An axial length of the throat may range between about 5 cm and about 10 cm. In such implementations, among others within the scope of the present disclosure, the third diameter may be about 2.8 cm. In such implementations, among others within the scope of the present disclosure, a maximum flow rate of each choke assembly may be about 10 BPM, velocity of the fluid conducted through the throat may be less than about 46 m/s at a fluid flow rate of about 10 BPM, and/or fluid conducted through the throat at a flow rate of about 10 BPM may experience a pressure drop of about 106 PSI.

The third diameter may be about 2.5 cm, and fluid conducted through the throat at a flow rate of about 10 BPM may experience a pressure drop of about 160 PSI.

The third diameter may be about 2.4 cm, and fluid conducted through the throat at a flow rate of about 10 BPM may experience a pressure drop of about 215 PSI.

The third diameter may be about 2.2 cm, and fluid conducted through the throat at a flow rate of about 10 BPM may experience a pressure drop of about 255 PSI.

Each choke assembly may further comprise a housing, and the body may be removably disposed within the housing. At least one of the housing and the body may comprise an inlet connector fluidly coupling the inlet with a first fluid conduit that fluidly connects the inlet with the corresponding pump, and at least one of the housing and the body may comprise an outlet connector fluidly coupling the outlet with a second fluid conduit that fluidly connects the outlet with the manifold.

The fluid may be fracturing fluid. However, other fluids are also within the scope of the present disclosure.

Each pump may discharge the fluid at a pressure ranging between about 4,000 PSI and about 15,000 PSI.

The present disclosure also introduces a method comprising: connecting a choke assembly in fluid communication between a pump and a manifold such that a fluid passage of the choke assembly conducts fluid from the pump to the manifold, wherein the fluid passage comprises: an inlet having a first diameter; an outlet having a second diameter; a substantially cylindrical throat having a third diameter that is substantially less than the first and second diameters; a contraction portion connecting the inlet and the throat and gradually decreasing from the first diameter to the third diameter along a longitudinal axis of the fluid passage; and an expansion portion connecting the throat and the outlet and substantially comprising a substantially cylindrical chamber having the second diameter; and operating the pump to move the fluid through the choke assembly toward the manifold.

Operating the pump to move the fluid through the choke assembly may produce a pressure drop in the fluid as the fluid moves through the choke assembly.

Operating the pump to move the fluid through the choke assembly toward the manifold may further move the fluid from the manifold into a wellbore extending into a subterranean formation.

The method may further comprise, while operating the pump to move fluid through the choke assembly toward the manifold, detecting pressure of the fluid at the inlet and the outlet.

Connecting the choke assembly in fluid communication between the pump and the manifold may comprise: connecting a first fluid conduit with an inlet connector of the choke assembly to fluidly couple the inlet with the first fluid conduit, wherein the first fluid conduit fluidly connects the inlet with the pump; and connecting a second fluid conduit with an outlet connector of the choke assembly to fluidly couple the outlet with the second fluid conduit, wherein the second fluid conduit fluidly connects the outlet with the manifold.

Operating the pump may comprise discharging the fluid from the pump at a pressure ranging between about 4,000 PSI and about 15,000 PSI.

An axial length of the throat may range between about 5 cm and about 10 cm, the third diameter may be about 2.8 cm, and operating the pump may move the fluid through the throat at a velocity less than about 46 m/s at a fluid flow rate of about 10 BPM. In such implementations, among others within the scope of the present disclosure, fluid conducted through the throat may experience a pressure drop of about 106 PSI.

An axial length of the throat may range between about 5 cm and about 10 cm, the third diameter may be about 2.5 cm, and operating the pump may move the fluid through the throat at a fluid flow rate of about 10 BPM. In such implementations, among others within the scope of the present disclosure, fluid conducted through the throat may experience a pressure drop of about 160 PSI.

An axial length of the throat may range between about 5 cm and about 10 cm, the third diameter may be about 2.4 cm, and operating the pump may move the fluid through the throat at a fluid flow rate of about 10 BPM. In such implementations, among others within the scope of the present disclosure, fluid conducted through the throat may experience a pressure drop of about 215 PSI.

An axial length of the throat may range between about 5 cm and about 10 cm, the third diameter may be about 2.2 cm, and operating the pump may move the fluid through the throat at a fluid flow rate of about 10 BPM. In such implementations, among others within the scope of the present disclosure, fluid conducted through the throat may experience a pressure drop of about 255 PSI.

The fluid may be fracturing fluid.

The present disclosure also introduces an apparatus comprising: a choke assembly for fluid connection between a manifold and a pump, wherein a fluid passage of the choke assembly comprises: an inlet having a first diameter; an outlet having a second diameter; a substantially cylindrical throat having a third diameter that is substantially less than the first and second diameters; a contraction portion connecting the inlet and the throat and gradually decreasing from the first diameter to the third diameter along a longitudinal axis of the fluid passage; and an expansion portion connecting the throat and the outlet and substantially comprising a substantially cylindrical chamber having the second diameter.

An end of the substantially cylindrical chamber may be defined by an annular surface extending radially from the throat such that the longitudinal axis of the fluid passage may be substantially coincident with a normal of the annular surface.

The contraction portion may substantially continuously decrease from the first diameter to the third diameter along the longitudinal axis of the fluid passage.

The choke assembly may decrease pressure of fluid conducted from the inlet to the outlet.

The first and second diameters may be substantially equal.

The choke assembly may further comprise: a body through which the fluid passage extends; an inlet connector for fluidly coupling the inlet with a first fluid conduit; and an outlet connector for fluidly coupling the outlet with a second fluid conduit.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus, comprising:
    a manifold;
    a plurality of pumps, each of the pumps having a suction and a discharge;
    a plurality of fluid conduits fluidly connecting each discharge of the plurality of pumps with the manifold; and
    a plurality of choke assemblies each connecting portions of the plurality of fluid conduits, wherein each choke assembly comprises a housing and a body, wherein the body is integrally formed as a single piece and removably disposable within the housing, the body having a sealed fluid passage conducting a first fluid flow through the respective choke assembly from a corresponding pump to the manifold, and wherein the body having the sealed fluid passage comprises:
        an inlet having a first diameter and fluidly connected to the plurality of pumps to receive the first fluid flow;
        an outlet having a second diameter substantially equal to the first diameter and fluidly connected to the manifold to discharge the first fluid flow;
        a cylindrical throat having a third diameter that is less than the first and second diameters;
        a contraction portion connecting the inlet and the cylindrical throat and gradually decreasing from the first diameter to the third diameter along a longitudinal axis of the sealed fluid passage; and
        an expansion portion connecting the cylindrical throat and the outlet and comprising a cylindrical chamber having the second diameter, wherein an end of the cylindrical chamber is defined by an annular surface extending radially from the cylindrical throat to an inner surface of the expansion portion such that the longitudinal axis of the sealed fluid passage is coincident with a normal of the annular surface, and wherein each choke assembly is operable to cause a pressure drop in the first fluid flow conducted through the respective choke assembly from the discharge of the corresponding pump to the manifold.

2. The apparatus of claim 1 wherein the contraction portion continuously decreases from the first diameter to the third diameter along the longitudinal axis of the sealed fluid passage.

3. The apparatus of claim 1 wherein each choke assembly further comprises:
an inlet connector fluidly coupling the inlet with a first fluid conduit that fluidly connects the inlet with the corresponding pump; and
an outlet connector fluidly coupling the outlet with a second fluid conduit that fluidly connects the outlet with the manifold.

4. The apparatus of claim 1 wherein:
an axial length of the cylindrical throat ranges between 5 centimeters (cm) and 10 cm;
the third diameter ranges between 2.2 cm and 2.8 cm; and
a maximum flow rate of each choke assembly is 10 barrels per minute (BPM).

5. The apparatus of claim 4 wherein the first fluid flow conducted through the cylindrical throat experiences a pressure drop of between 106 pounds per square inch (PSI) and 255 PSI.

6. The apparatus of claim 1 wherein:
at least one of the housing and the body comprises an inlet connector fluidly coupling the inlet with a first fluid conduit that fluidly connects the inlet with the corresponding pump; and
at least one of the housing and the body comprises an outlet connector fluidly coupling the outlet with a second fluid conduit that fluidly connects the outlet with the manifold.

7. The apparatus of claim 1 wherein the first fluid flow is a fracturing fluid flow, and wherein each pump discharges the fracturing fluid flow at a pressure ranging between 4,000 PSI and 15,000 PSI.

8. The apparatus of claim 1 wherein the housing is positioned between a first fluid conduit portion and a second fluid conduit portion of the plurality of fluid conduits, wherein the first fluid conduit portion interfaces with a first outer surface of the housing, and wherein the second fluid conduit portion interfaces with a second outer surface of the housing, opposite the first outer surface.

9. The apparatus of claim 8 wherein the second fluid conduit portion comprises a conduit inner diameter that is substantially equal to the second diameter.

10. The apparatus of claim 1 wherein the housing comprises an internal mating shoulder configured to contact an external mating shoulder of the body.

11. The apparatus of claim 1 wherein an interface between the annular surface and the inner surface of the expansion portion is tapered or rounded.

12. An apparatus, comprising:
a choke assembly for fluid connection between opposing portions of a fluid conduit disposed between a manifold and a discharge of a pump, wherein the choke assembly is operable to cause a pressure drop in a first fluid flow conducted through the choke assembly from the discharge of a corresponding pump along the fluid conduit, wherein the choke assembly comprises a housing and a body, wherein the body is integrally formed as a single piece and removably disposable within the housing, and wherein the body of the choke assembly defines a sealed fluid passage of the choke assembly and comprises:
an inlet having a first diameter, wherein the inlet is configured to receive the first fluid flow;
an outlet having a second diameter equal to the first diameter, wherein the outlet is configured to discharge the first fluid flow;
a cylindrical throat having a third diameter that is less than the first and second diameters;
a contraction portion connecting the inlet and the cylindrical throat and gradually decreasing from the first diameter to the third diameter along a longitudinal axis of the sealed fluid passage; and
an expansion portion connecting the cylindrical throat and the outlet and comprising a cylindrical chamber having the second diameter, wherein an end of the cylindrical chamber is defined by an annular surface extending radially from the cylindrical throat to an inner surface of the expansion portion such that the longitudinal axis of the sealed fluid passage is coincident with a normal of the annular surface.

13. The apparatus of claim 12 wherein the contraction portion continuously decreases from the first diameter to the third diameter along the longitudinal axis of the sealed fluid passage.

14. The apparatus of claim 12 wherein each choke assembly further comprises:
an inlet connector fluidly coupling the inlet with a first fluid conduit that fluidly connects the inlet with the corresponding pump; and
an outlet connector fluidly coupling the outlet with a second fluid conduit that fluidly connects the outlet with the manifold.

15. The apparatus of claim 12 wherein:
at least one of the housing and the body comprises an inlet connector fluidly coupling the inlet with a first fluid conduit that fluidly connects the inlet with the corresponding pump; and
at least one of the housing and the body comprises an outlet connector fluidly coupling the outlet with a second fluid conduit that fluidly connects the outlet with the manifold.

16. The apparatus of claim 12 wherein the first fluid flow is a fracturing fluid flow, and wherein each pump discharges the fracturing fluid flow at a pressure ranging between 4,000 PSI and 15,000 PSI.

17. The apparatus of claim 12 wherein an axial length of the cylindrical throat ranges between 5 centimeters (cm) and 10 cm.

18. The apparatus of claim 12 wherein a maximum flow rate of each choke assembly is 10 barrels per minute (BPM).

19. The apparatus of claim 12 wherein:
an axial length of the cylindrical throat ranges between 5 centimeters (cm) and 10 cm;
the third diameter ranges between 2.2 cm and 2.8 cm; and
a maximum flow rate of the choke assembly is 10 barrels per minute (BPM).

20. The apparatus of claim 19 wherein the first fluid flow conducted through the cylindrical throat experiences a pressure drop of between 106 pounds per square inch (PSI) and 255 PSI.

* * * * *